(12) United States Patent
Andersen (10) Patent No.: US 10,494,915 B2
(45) Date of Patent: Dec. 3, 2019

(54) WELLBORE LEAKAGE DETECTION TOOL AND METHOD FOR ASSEMBLING SUCH TOOL

(71) Applicant: BERGEN TECHNOLOGY CENTER AS, Nesttun (NO)

(72) Inventor: Morten Ivar Andersen, Rådal (NO)

(73) Assignee: BERGEN TECHNOLOGY CENTER AS, Nesttun (NO)

( * ) Notice: Subject to any disclaimer, the term of this patent is extended or adjusted under 35 U.S.C. 154(b) by 0 days.

(21) Appl. No.: 16/092,624

(22) PCT Filed: May 31, 2017

(86) PCT No.: PCT/NO2017/050138
§ 371 (c)(1),
(2) Date: Oct. 10, 2018

(87) PCT Pub. No.: WO2017/222387
PCT Pub. Date: Dec. 28, 2017

(65) Prior Publication Data
US 2019/0120045 A1    Apr. 25, 2019

(30) Foreign Application Priority Data
Jun. 23, 2016  (NO) .................................. 20161051

(51) Int. Cl.
*E21B 47/10* (2012.01)
*E21B 47/01* (2012.01)
*G01V 1/52* (2006.01)

(52) U.S. Cl.
CPC ............ *E21B 47/101* (2013.01); *E21B 47/01* (2013.01); *G01V 2001/526* (2013.01)

(58) Field of Classification Search
CPC ............................... E21B 47/101; E21B 47/01
USPC ..................................................... 73/152, 150
See application file for complete search history.

(56) References Cited

U.S. PATENT DOCUMENTS

| 3,991,850 A | 11/1976 | Escaron |
| 4,945,775 A * | 8/1990 | Adams .................... E21B 47/00 73/865.8 |
| 5,354,956 A | 10/1994 | Orban et al. |

(Continued)

FOREIGN PATENT DOCUMENTS

WO    WO 2011/091505 A1    8/2011

OTHER PUBLICATIONS

Norwegian Search Report for Norwegian Application No. 20161051, dated Oct. 31, 2016, with English translation.

(Continued)

*Primary Examiner* — Justin Seo
*Assistant Examiner* — Rodney T Frank
(74) *Attorney, Agent, or Firm* — Birch, Stewart, Kolasch & Birch, LLP (57) ABSTRACT

A wellbore leakage detection tool and method for assembling such tool includes a longitudinal tool element, including a through bore perpendicular to a longitudinal axis of the longitudinal tool element, an acoustic insulator or damper arranged in the through bore, and an acoustic sensor assembly arranged suspended in the acoustic insulator or damper inside the through bore. The acoustic insulator or damper has an acoustic impedance different from an acoustic impedance of the tool element.

9 Claims, 4 Drawing Sheets

(56) References Cited

U.S. PATENT DOCUMENTS

| | | | | |
|---|---|---|---|---|
| 6,173,606 B1* | 1/2001 | Mosley | ............... | E21B 47/0005 |
| | | | | 166/253.1 |
| 6,354,146 B1* | 3/2002 | Birchak | ................ | E21B 47/101 |
| | | | | 73/61.79 |
| 6,588,267 B1* | 7/2003 | Bradley | ................. | G01V 1/523 |
| | | | | 181/102 |
| 8,103,135 B2* | 1/2012 | Head | ..................... | E21B 17/023 |
| | | | | 385/12 |
| 2005/0173185 A1 | 8/2005 | Pabon et al. | | |
| 2006/0185430 A1 | 8/2006 | Yogeswaren | | |
| 2010/0268489 A1* | 10/2010 | Lie | ........................ | E21B 47/101 |
| | | | | 702/51 |
| 2011/0037734 A1* | 2/2011 | Pance | ...................... | G06F 3/016 |
| | | | | 345/177 |
| 2011/0073310 A1* | 3/2011 | Clemens | ................. | E21B 23/01 |
| | | | | 166/285 |
| 2012/0053585 A1* | 3/2012 | Nycz | .................... | A61B 8/0841 |
| | | | | 606/62 |
| 2015/0136398 A1* | 5/2015 | Armstrong | .............. | E21B 31/18 |
| | | | | 166/301 |
| 2019/0120045 A1* | 4/2019 | Andersen | .............. | E21B 47/101 |

OTHER PUBLICATIONS

International Search Report, issued in PCT/NO2017/050138, dated Sep. 21, 2017.
Written Opinion of the International Searching Authority, issued in PCT/NO2017/050138, dated Sep. 21, 2017.

* cited by examiner

WELLBORE LEAKAGE DETECTION TOOL AND METHOD FOR ASSEMBLING SUCH TOOL

FIELD OF THE INVENTION

The invention is in the field of wellbore downhole logging technology. More specifically it is related to detection of leakages past well barriers that may compromise the well integrity.

BACKGROUND ART

For the purpose of this document, and in line with the general definition of the term, "acoustic waves" are defined to include both sound and ultrasound waves. Similarly, "acoustic noise" includes both sound and ultrasound noise.

In the well, the acoustic waves originating from a leakage and the acoustic waves originating from other sources are both termed acoustic noise, although within the technical discipline of leakage detection, the noise from the leakage can be seen as the desired signal to be detected, and the noise from other sources can be seen as the background noise. The difference between the desired signal and the background noise is defined as the signal to noise ratio. In this document the acoustic waves originating from a leakage are termed "noise signal", while the acoustic waves originating from other sources are termed "background noise".

Leakages through wellbore tubular walls, such as tubing or casing or other wellbore barriers, such as formation leaks, can reduce a well's performance throughout its life and cause serious health, safety and environmental issues. With conventional leak-detection methods reliability of diagnosis varies, as results can be affected by both leak-rate, leak size and location.

The term Leakage is used in this document to describe any cause of unwanted flow from one location in the well to another, typically across breached well barriers. Such leakages threaten well integrity. Fluid flow is driven across a breached barrier by differential pressure, with fluid running from a higher to a lower pressure side. Flow through a well-localized leakage point, e.g. through a hole opening in tubing or past threads in a piping joint, is typically termed a leak, while leakages along distributed channels are termed flow paths.

Leakage rate describes the fluid volume flow as a function of time, and for a given leak size, a larger leakage rate will induce more acoustic noise and thus be easier to detect than a lower leakage rate.

On the other hand, the degree of noise-inducing fluid turbulence is more closely related to fluid velocity than fluid rate, and a small rate leakage through a small size flow restriction may thus be easier to detect than a larger rate leakage through a larger opening. A large leak can be challenging to detect acoustically if the velocity is low.

In addition, multiple leaks and leaks beyond the primary tubular are generally more challenging to detect and locate efficiently.

Further, barrier failures can occur due to mechanical failures or weakness, or changes in the wellbore pressure. This leads to an unwanted flow that can have a variety of outcomes, including poor well performance, ground water or reservoir contamination and/or more catastrophic, uncontrolled fluid escape at surface.

The unwanted flow, often seen as turbulent liquid or gas flowing through small restrictions in the annuli, generates acoustic waves that can be detected by sensor devices and systems adapted for this purpose. It is important not only to detect that a leak has occurred, but also be able to specify the location of the origin of the flow. This usually involves a combination of downhole acoustic sensors and equipment for processing the data.

The processed data can typically represent a noise profile over the length of the wellbore. Areas with excessive noise could indicate a leak or a flow.

High reliability of the results obtained is important, since the next action to be taken depends on the reliability of the result. Confidence in the data enables faster, more effective remediation decisions and potentially, can save wells from premature re-completion or abandonment.

It should be noted initially that although both flow detection and acoustic logging often use results of acoustic measurements to obtain the desired set of data, there is an important difference when it comes to the signals actually detected. For acoustic logging purposes the logging tool often comprises both transmitters and receivers, or in some cases, only receivers if the transmitters are placed in a different location. However, in both cases, the transmitters and receivers are part of the system, and the location of the transmitters and receivers are known. This could mean signal encoding and decoding, predetermined frequency hopping etc. to allow background noise to be cancelled out.

This is not the case for a noise detection system, where there is no known transmitter. The characteristics and location of the noise signal will differ from one leak to the other and the receiver or sensor will have to rely on a signal that is in principle totally unknown. Thus, signal/noise improvement techniques such as mentioned used for traditional wellbore logging systems cannot be used for a noise detection system.

It is common in the field to perform stationary logging in the wellbore for the purpose of detecting leaks and flows. The logging tool is then positioned at a specific location while the measurement, by e.g. acoustic sensors is performed. For deep wellbores such stationary measurements take long time, since a large number of stations is required to obtain the necessary data for further processing to locate the potential leak.

It is possible to use dynamic logging, i.e. continuous scanning, or combinations of dynamic and stationary logging to determine locations of unwanted leaks and flows faster. Stationary logging is then used in regions of the wellbore of specific interest, e.g. as a result of indications obtained during dynamic logging.

International patent publication WO2011091505 (A1) discloses how signals from a number of acoustic sensing means, adapted to sense individual acoustic signals from a plurality of corresponding locations along said wellbore, are analysed to determine if there exists a common acoustic component in acoustic signals generated from proximate locations in said wellbore.

For acoustic well tools, it is well known that the accuracy can be improved by keeping the tool centred in the tubular. Typically, centralizers with spring-loaded arms are integrated in the tool string to keep the tool centred, with rollers or similar making contact with the inner walls of the surrounding tubular.

One drawback with the use of centralizers in such applications is that the centralizers contribute to generate so called "road noise" when the tool is travelling up and down the well due to the mechanical contact between the centralizer and the tubular. Road noise may significantly reduce the signal to noise ratio with dynamic logging.

Stationary measurements can be used to avoid such background noise problems, but this requires much more time than dynamic logging. One way to overcome this problem is to combine scanning with stationary measurements to obtain a better signal/noise ratio of areas of specific interest. However, this takes more time and is more complex than dynamic logging.

Road noise propagates through the fluid of the wellbore and through the body of the tool. Some road noise is related to the continuous scratching or rolling of the centralizers along the inner wall of the tubular, while a different type of background noise occurs when the centralizers passes joints, step change in inner diameter, or other construction details. This latter background noise has the character of a mechanical impact noise.

Typically, road noise is low frequent and some of the noise can be filtered out by a high pass filter directly. However, this could reduce the reliability of the data, since important low frequency noise profiles can be lost.

U.S. Pat. No. 3,991,850 (A) discloses a system for reducing acoustic background noise, or road-noise inherently generated by the rubbing of the outward faces of the spring members of the centralizers along the well bore walls by covering a portion of the inward faces of the spring members with a composite material including an elastomer containing a substantial number of small embedded particles or interspersed balls of a sound absorbing material such as lead.

The wellbore pressure can be in the order of 1000 bars or $10^9$ Pa. Thus, the tool and all the components have to withstand high pressure.

In prior art it is well known to use hydrophones for leak detection. Hydrophones have a good sensitivity for lower frequencies, and the response is relatively flat over its bandwidth. However, one problem related to hydrophones is that the road noise described above is most prominent in the audible range—which typically coincides with dominant bandwidth for hydrophone-based downhole tools. Another drawback with hydrophones, is that tool-integration is generally complex mechanically. Typically, hydrophone integration in a downhole tool may involve protected mounting within an internal oil filled chamber, with a piston or membrane arrangement used to equalize pressure with the surrounding well fluid. Pressure equalization allows for using a thinner tool housing locally in order to reduce losses, but having a metal barrier to an internal oil chamber remains non-optimal for acoustic signal transfer. As will be understood, such hydrophone arrangements also require relatively frequent maintenance.

US patent application publication US20100268489 discloses a method of quantifying, detecting and localizing one or more leaks or a flow of liquid, gasses, or particles, in an oil or gas producing well, wherein said method employs at least one acoustic transducer deployed in operation in the well, characterized by that said method comprises steps of:

(a) detecting one or more signals using the at least one acoustic transducer, wherein said one or more signals are generated by acoustic noise from one or more leaks or flow of liquid, gasses, or particles in a region surrounding said at least one transducer;

(b) amplifying said one or more signals to generate one or more corresponding amplified signals for inputting into a processing unit local to the at least one transducer;

(c) filtering said one or more amplified signals over several frequency ranges by utilizing dynamic filtering for improving signal-to-noise ratio by filtering away background noise in said one or more amplified signals, thereby generating corresponding filtered data; and (d) processing said filtered data in said processing unit for transmitting said filtered data to a unit including a computer in a surface region remote from the at least one acoustic transducer for storage and/or viewing of said filtered data, said computer being adapted to perform simultaneous resolution of said filtered data to identify occurrence of said one or more leaks or a flow of liquid, gasses, or particles, in an oil or gas producing well.

U.S. Pat. No. 5,354,956 depicts an ultra-sonic sensor assembly for a downhole tool comprising a sensor stack having an inner sound absorbing backing element and a piezoelectric ceramic disk stacked outwardly adjacent said backing element, an impedance matching layer disposed outwardly adjacent said ceramic disk, a rubber jacket having sides which are disposed outwardly around said backing element, said ceramic disk and said matching layer, and an end disposed adjacent said impedance matching layer, a delay-line of rigid material disposed outwardly of said ceramic disk, said delay-line having inner and outer ends, said inner end facing said end of said rubber jacket, and first and second electrical connectors, and inner and outer electrode means for connecting inner and outer sides of said disk to said first and second electrical connectors.

Short Summary of the Invention

A main objective of the present invention is to disclose a wellbore leakage detection tool that overcomes the problems of prior art above, and to improve the tools resolution for both stationary and dynamic logging.

Another objective is to shorten logging time.

In addition, it is an object of the present invention to simplify and provide a logging tool that requires less maintenance and down time.

A further aim of the invention is to provide a tool that can easily be tailored to specific applications with different requirements.

The invention is a wellbore leakage detection tool (1) comprising;

a longitudinal tool element (2) with centralizers (102), said tool element (2) comprising a through bore (10) perpendicular to a longitudinal axis of said longitudinal tool element (2), acoustic insulation means (11) arranged in said through bore (10), an acoustic sensor assembly (20), wherein said acoustic sensor assembly (20) comprises; a housing (21), an acoustic sensor (28) arranged inside said housing (21), wherein said housing has first and second ends (22, 23) arranged on opposite sides of said acoustic sensor (28) and facing laterally outwards of opposite ends of said through bore (10), wherein said acoustic sensor (28) is an ultrasonic contact transducer, wherein said first and second ends (22, 23) are arranged to interface a wellbore fluid, and wherein said acoustic sensor (28) is in direct contact with said housing (21), and said assembly (20) arranged suspended in said acoustic insulation means (11) inside said through bore (10), wherein said acoustic insulation means (11) has an acoustic impedance different from an acoustic impedance of said tool element (2).

The invention is also a method for assembling a wellbore leakage detection tool (1), said method comprises the following steps;

assembling the leakage detection tool (1) comprising a tool element (2) with a longitudinal direction, and provided with centralizers (102), characterized by—assembling an acoustic ultrasonic sensor assembly (20) by arranging an ultrasonic acoustic sensor (28) inside, and in direct contact with a housing (21), wherein the housing (21) has first and second ends (22, 23) arranged on opposite sides of said acoustic sensor (28), arranging said ultrasonic acoustic sensor assembly (20) with said first and second ends (22, 23) facing laterally outwards of opposite ends of a through bore (10), perpendicular to the longitudinal direction of a tool element (2)

suspending said ultrasonic acoustic sensor assembly (20) in damping means (11) arranged in a through bore (10), wherein said damping means has an acoustic impedance different from an acoustic impedance of said tool element (2) for ultrasonic signals.

The wellbore leakage detection tool according to the invention has the advantage that it is significantly less affected by wellbore background noise propagating along the tool string. Thus, the signal to noise ratio is improved both for stationary and dynamic logging operations. The invention allows for an improved resolution in depth profiling of the actual noise image, giving better discrimination of two or more closely separated leaks and better resolution of noise characteristics along distributed flow paths.

Further, for dynamic logging in particular, the pick-up and impact of road noise is considerably reduced with respect to prior art, allowing for extended usable bandwidth and increased sensitivity with dynamic logging.

The de-coupling of low frequent road noise improves the signal to noise ratio in the lower part of the acoustic spectrum, allowing the whole range of acoustic wavelengths sensed by the flow detection tool to contribute to the detection and localization of potential leak or flow.

The tool can operate in areas with high pressure, since the sensor assembly is arranged in the through bore, such that forces arising from the wellbore pressure are balanced out.

A further advantage compared to prior art, is that sensor integration is simple and requires less maintenance than prior art tools. Sensor replacement requires minimal down time.

The wellbore leakage detection tool has no protruding elements. Thus, the tool can be used in narrow wellbores without coming into conflict with obstacles that may be present.

The invention further comprises several advantageous embodiments, e.g. for the acoustic sensor assembly, resulting in high bandwidth, high sensitivity and improved quality control through stages of manufacturing.

FIGURE CAPTIONS

The attached figures illustrate some embodiments of the claimed invention.

EMBODIMENTS OF THE INVENTION

The invention will in the following be described and embodiments of the invention will be explained with reference to the accompanying drawings.

Figure 1:
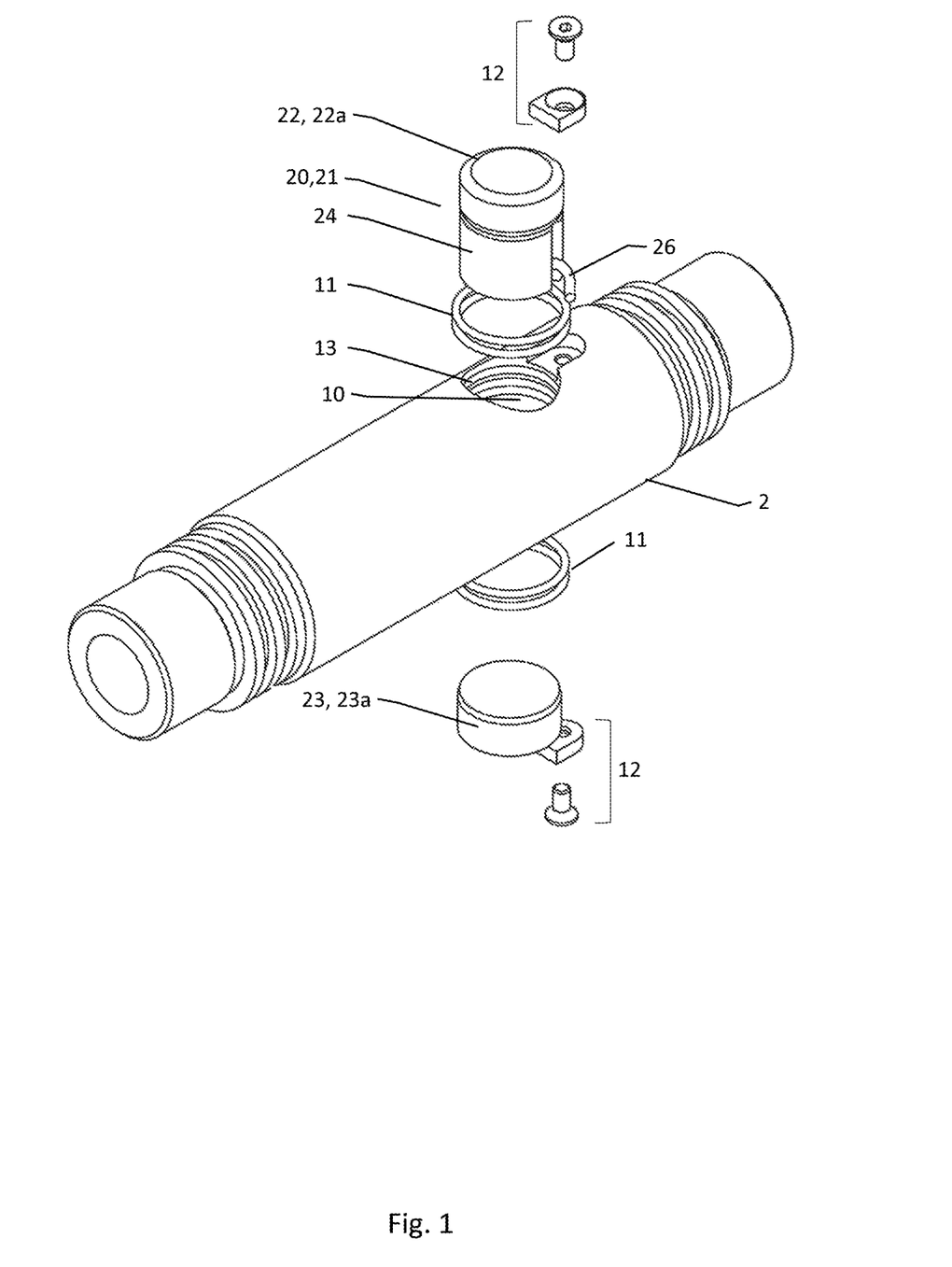
FIG. 1 illustrates in an exploded view a section of a wellbore leakage detection tool according to an embodiment of the invention.
Figure 2A:
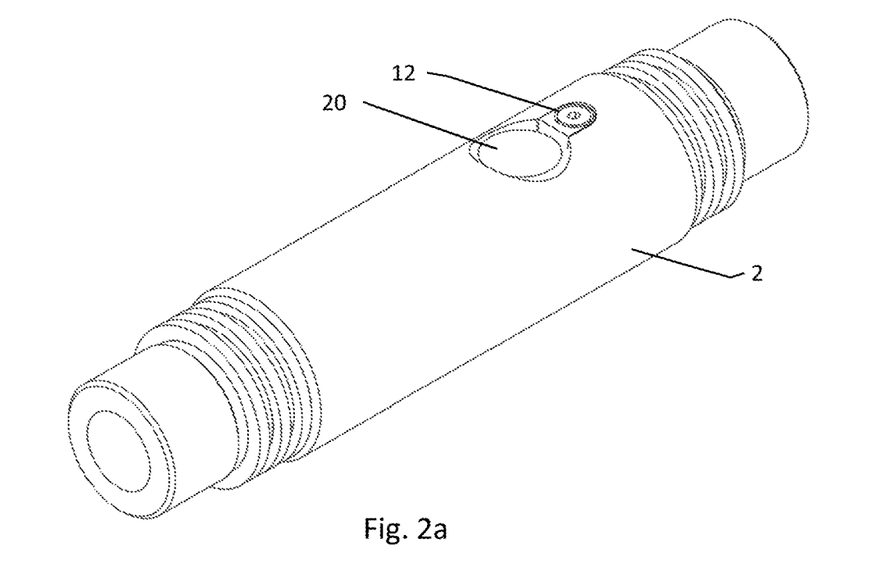
FIG. 2*a* illustrates in a perspective view the same embodiment as in FIG. 1.
Figure 2B:
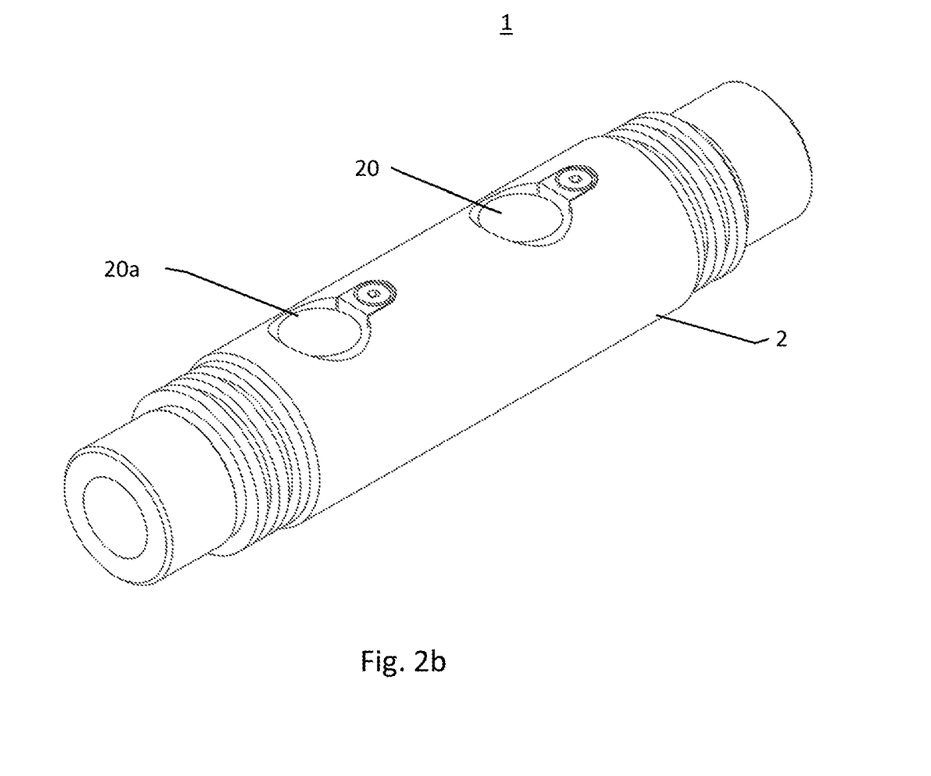
FIG. 2*b* illustrates in a perspective view multiple sensors in the same tool.

An embodiment of the invention is illustrated in FIGS. 1 and 2, where FIG. 1 is an exploded view of the illustration in FIG. 2*a*, and some of the technical elements are only visible in the exploded view.

The wellbore leakage detection tool (1) comprises in this embodiment a longitudinal tool element (2) also referred to as a sensor sub, that comprises a through bore (10) perpendicular to the longitudinal direction of the tool element (2). Inside the through bore, acoustic insulation means (11) are arranged as illustrated in FIG. 1.

The tool (1) further comprises an acoustic sensor assembly (20) arranged suspended in said acoustic insulation means (11) inside said through bore (10). The acoustic insulation means (11) has an acoustic impedance different from an acoustic impedance of said tool element (2).

In an embodiment the acoustic sensor assembly (20) has first and second ends (22, 23) arranged on opposite sides and facing laterally outwards of opposite ends of said through bore (10).

Figure 3:
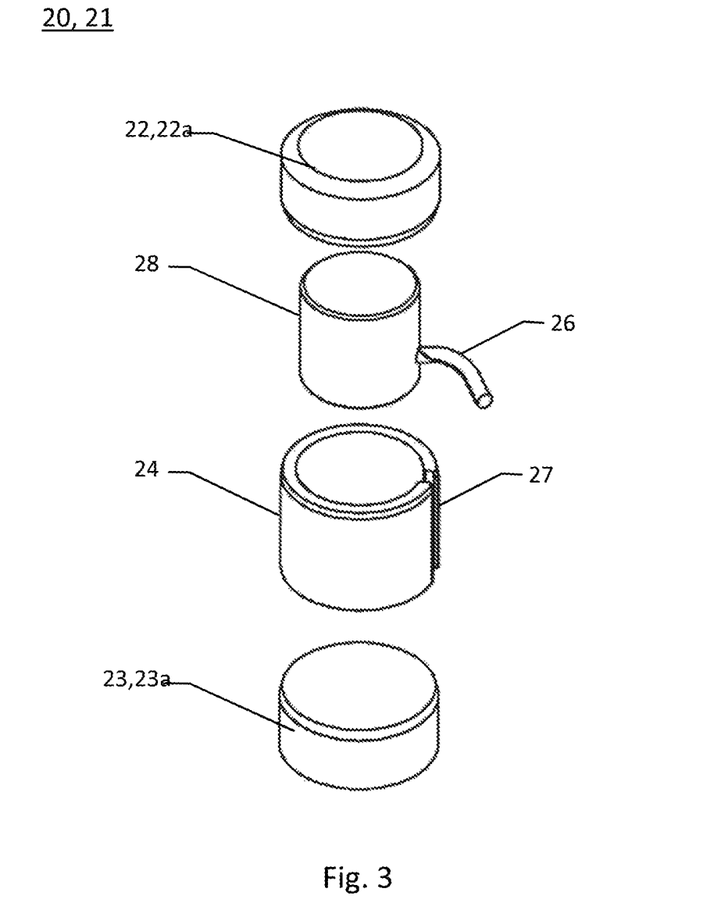
FIG. 3 illustrates an exploded view of the acoustic sensor assembly according to an embodiment the invention.

According to an embodiment the acoustic sensor assembly (20), or insert, comprises a housing (21) and an acoustic sensor (28) arranged inside the housing (21) as illustrated in FIG. 3, wherein the housing has first and second ends (22, 23) arranged on opposite sides of the acoustic sensor (28) and facing laterally outwards of opposite ends of the through bore (10).

In all the embodiments above, the first and second ends (22, 23) are arranged to interface a wellbore fluid, and preferably the acoustic sensor (28) is in direct acoustic contact with the housing (21), or the said first and second ends (22, 23). This provides an acoustic signal path, or connection from the barrier leak (BL) or the annular flow path (AF), through the wellbore fluid, e.g. in the tubing, to the first and second ends (22, 23) and further to the sensor element (28).

In an embodiment that can be combined with any of the embodiments above, the acoustic sensor assembly (20), and its comprised acoustic sensor (28) is arranged to sense sound and ultrasound waves up to 100 kHz, 200 kHz, 300 kHz, 500 kHz, 800 kHz or 1 MHz. The combination of sound and ultrasound expands sensitivity to a wider range of frequencies and thereby increases capability and probability for detecting and localizing a leak, and with higher localization accuracy. Tools based on traditional hydrophones typically only operate in the audible range; optionally extended to include a low frequency range of ultrasound.

Analysis have shown that higher frequencies can contain useful information regarding a leakage, and that it is possible to determine characteristics of the leak or flow by relying on the high frequency information. However, in many applications high frequency noise components propagating along the tool string are present, leading to a reduced resolution.

Thus, the tool according to the invention may also be used for detection of leakages only in the ultrasonic frequency range above the audible frequencies, such as e.g. above 100 kHz to improve signal-to-noise ratio and resolution. In such cases, the acoustic sensor (28) may be specifically designed to sense only such higher frequencies.

In an embodiment the acoustic sensor (28) is an ultrasonic contact transducer arranged to be in direct contact with a structure bearing acoustic energy, in this case the housing (21) or the first and/or second ends (22, 23) of the housing.

Such sensors have good sensitivity over wide bandwidth, with particularly high sensitivity for the ultrasound range.

Acoustic attenuation and losses are frequency dependent, and increasing with frequency. Lower frequency signals propagate farther distance through well fluid, tubing, casing etc., and short-ranging ultrasound detection may therefore enable significantly improved source localization.

Further, road noise can often be filtered out while maintaining the signal characteristics in the higher frequency components.

The ultrasonic contact transducer is in an embodiment a single-element, piezoelectric transducer.

In an embodiment that can be combined with any of the embodiments above, the housing (21) comprises
first and second sensor caps (22a, 23a), and
a middle element (24)
as illustrated in the exploded view in FIG. 3.

The first and second sensor caps (22a, 23a) are arranged on opposite sides of the acoustic sensor (28) and facing laterally outwards of opposite ends of the through bore (10), while the middle element (24) is arranged about a middle section of the acoustic sensor (28).

Further, more specific optional details of the acoustic sensor assembly (20) that can be seen as separate embodiments from the embodiments above, are described below. These embodiments can be combined individually and with the embodiments above.

Anti-rotation means, such as a pin interconnecting the elements of the housing (21) can be used to prevent the different elements from rotating relative each other.

The acoustic sensor (28) has an electrical wiring (26), such as a cable connected to a sensor circuit, not shown. The sensor circuit can be arranged in the wellbore leakage detection tool (1), on surface, or a combination, where the tool body comprises pre-amplification and/or pre-processing circuits.

In FIG. 3 a slit (27) through the middle element (24) for the electrical wiring (26) is shown. The wiring (26) may be terminated in the wellbore leakage detection tool (1), such that sensor signals can be sent up to the surface e.g. by wireline.

In an embodiment the acoustic sensor (28) is glued to the first and/or second sensor caps (22a, 23a). The glue will ensure that there is good acoustic contact between the sensor caps (22a, 23a) and the acoustic sensor (28), and that the sensor stays in place within the casing. High temperature grease or similar may optionally be used to achieve acoustic contact through fluid coupling as an alternative to glue or adhesive.

In an embodiment (not illustrated), with or without glue, the acoustic sensor assembly (20) comprises a resilient element, such as a spring arranged to force the sensor element (28) towards one of the sensor caps (22a, 23a).

When the acoustic insulation means (11) has an acoustic impedance different from an acoustic impedance of the tool element (2) the background noise signals carried along the tool body will be partially reflected and scattered at the interface between the two different materials with different acoustic impedance. A larger difference in impedance will increase reflection. The characteristic acoustic impedance for steel is typically 46 MRayl, while for Titanium, the number is 27 MRayl. On the other hand, Plastics and rubbers have a characteristic acoustic impedance typically in the range of 1 to 3 MRayl.

In related embodiments, characteristic impedance of the acoustic insulation means (11) is 20%, 30%, 40% or 50% lower than the characteristic impedance of the tool element (2).

In an embodiment the tool element (2) is made of metal, while the acoustic insulation means (11) is manufactured in polymers or rubber.

In another embodiment the tool element (2) is manufactured in a plastic material, while the acoustic insulation means (11) is manufactured in a plastic or rubber material with a different characteristic impedance.

In yet another embodiment the tool element (2) is manufactured in a plastic material, while the acoustic insulation means (11) is a metal.

In an embodiment the acoustic sensor assembly (20) is replaceable. I.e. it can be removed from the tool element (2) and inserted or replaced by another acoustic sensor assembly (20).

In FIGS. 1 and 2 it is illustrated an embodiment with lateral end stop means (12) arranged to secure said acoustic sensor assembly (20) from disengaging from said tool element (2) in a lateral direction. The end stop means (12) in the illustration are shown securing both the first and second ends (22, 23) of the acoustic sensor assembly (20). The end stop means (12) are in normal operation not in contact with the acoustic sensor assembly (20). If the end stop means (12) have to be in contact with the acoustic sensor assembly (20), the contact surface should be small, to restrict acoustic connectivity. In an embodiment, spacer elements between the end stop means (12) and first and second ends (22, 23) of the acoustic sensor assembly (20) is used, where the spacer elements are manufactured in an acoustic insulating material.

The end stop means on the two ends can be individually different, depending on the design of the tool element (2) and the sensor assembly (20).

In an embodiment the housing (21) and the acoustic sensor (28) forms an integral acoustic sensor assembly (20). This can be the case if the sensor (28) itself is specially designed to support the high pressure of a wellbore. In this case the reinforced housing (21) is an integral part of the sensor itself.

The acoustic insulation means (11) can be of different types, as long as it has an acoustic impedance different from an acoustic impedance of said tool element (2) for the involved sound and/or ultrasonic signals. In an embodiment, as seen illustrated in FIGS. 1 and 2, the acoustic insulation means (11) is one or more O-rings arranged about said ultrasonic acoustic sensor assembly (20);

In a related embodiment the tool element (2) comprises grooves (13) in the circumference of the through bore (10), where the O-rings can be arranged before the sensor assembly (20) is mounted. In this way the O-rings stay in place when the sensor assembly (20), or parts of the sensor assembly (20) is pushed into the through bore (10) to obtain the desired suspension effect.

In an alternative embodiment, the sensor assembly (20) may comprise outer, circumferential grooves where the O-rings can be arranged before mounting. In a combined embodiment, both the through bore (10) and the sensor assembly (20) comprise such grooves for increasing transversal stability of the sensor assembly (20).

In an alternative embodiment, the acoustic insulation means (11) are stripes of plastic material arranged transversally in the through bore, optionally in combination with the O-rings above.

The embodiment of the flow detection tool (1) as shown in FIGS. 1, 2 and 3, is mounted by first entering the electric wire into an open space inside the tool element (2) where it is connected to an electric circuit in the leakage detection tool.

The middle element (24) of the housing (21) is then arranged outside the sensor element (28), and the first sensor cap (22a) is mounted on top of the sensor (28). This assembly is then pushed into the through bore (10), while the electric wire is arranged in the slit (27). Next, the second sensor cap (23a) is pushed into the through bore (10) from the opposite side. Finally, the end stop means (12) are mounted on both sides.

In an embodiment the invention is a method of assembling a wellbore leakage detection tool (1), wherein the method comprises the step of suspending the ultrasonic acoustic sensor assembly (20) in insulating means (11) arranged in a through bore (10) of a tool element (2), wherein said insulating means has an acoustic impedance different from an acoustic impedance of said tool element (2) for ultrasonic signals.

In a related embodiment, the method further comprises assembling said acoustic sensor assembly (20) by arranging an acoustic sensor (28) inside, and in direct contact with said housing (21), where the housing (21) has first and second ends (22, 23) arranged on opposite sides of said acoustic sensor (28), and arranging said ultrasonic acoustic sensor assembly (20) with said first and second ends (22, 23) facing laterally outwards of opposite ends of said through bore (10).

The acoustic sensor (28) can in an embodiment be of any of the types described above.

In the next sections the typical use and application of the wellbore leakage detection tool (1) in a wellbore will be explained further.

Figure 4:
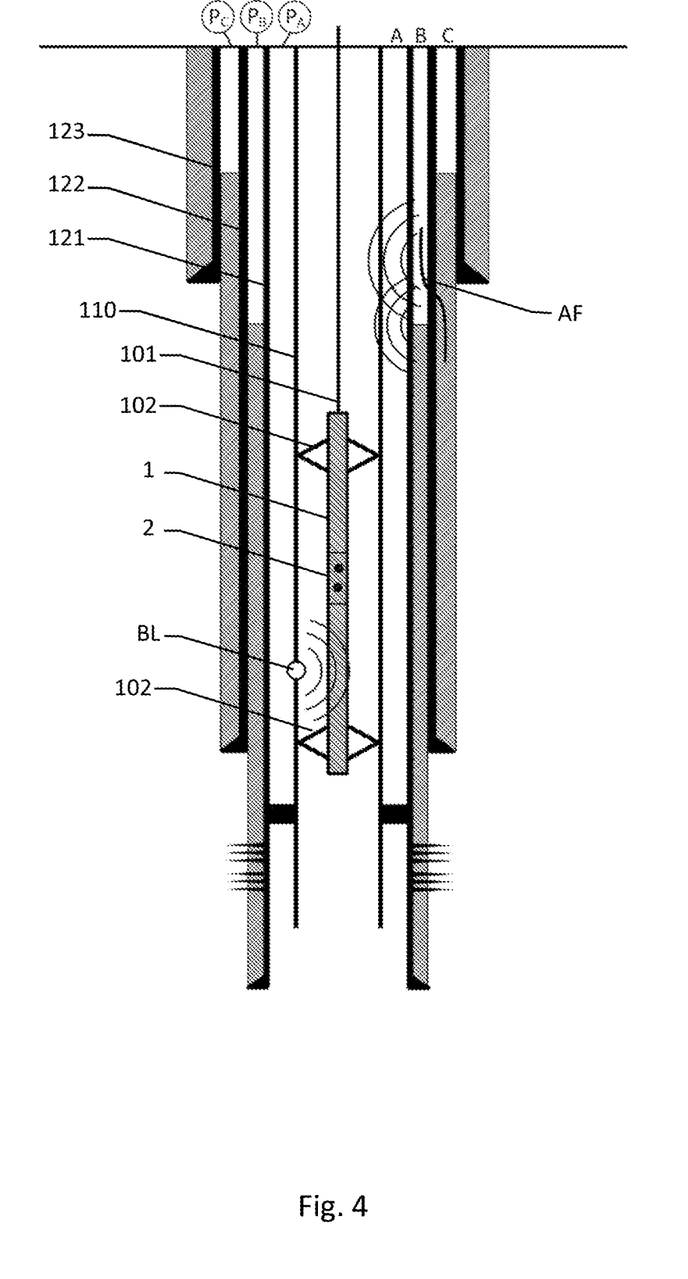
FIG. 4 shows a simplified section view of a wellbore with the wellbore leakage detection tool in operation.

FIG. 4 illustrates an example section view of a wellbore with tubing surrounded by liner and casing sections (121, 122, 123) These sections form the A, B and C annuli from the tubing and outwards. The casing and liner separating the annuli is a barrier between the annuli that usually have different pressure as indicated by the references PA, PB, PC, representing the pressure in the A, B and C annulus, respectively.

If a leakage occurs between any of the annuli, the flow from one annulus to another will generate noise as a result of the differential pressure between the annuli. In FIG. 4 a barrier leak through the tubing (BL), illustrated as a circle, and an annular flow path (AF) through the cement in the C-annulus and further through the casing to the B-annulus, illustrated as a bended line, are shown. Such leaks or flow paths will generate sound or ultrasound waves as illustrated by the half-circles. Depending on the difference in pressure, size of the leak etc. these waves will have different properties.

Further in FIG. 4, a leakage detection tool (1), according to an embodiment of the invention, is illustrated schematically inside the tubing (110). The tool (1), as part of a toolstring, is run along the tubing (110) via a wireline (101) connected to the top of the toolstring. To keep the toolstring centred in the tubing, centralizers (102) are used. In this case arranged in upper and lower ends of the toolstring. The toolstring comprises the leakage detection tool (1), the centralizers (102) and other optional tools or elements, such as a telemetry module at the top, and a pressure barrier end-plug in the lower end.

The leakage detection tool (1) itself comprises in an embodiment an electronics unit/tool section arranged close to the tool element (2), which in this case is a sensor sub. The tool element (2) may in one embodiment have an electric feed through to allow for communication between the telemetry module and other tool elements arranged below the tool element (2).

The tool element (2) is in an embodiment a sensor sub as illustrated in FIGS. 1 and 2, mechanically and electrically connected in a tool string to a telemetry module for communication with a surface apparatus. Two or more centralizers can be arranged at appropriate intervals along the tool string, to ensure that the tools of the tool string are kept steady in the centre of the wellbore casing or tubing. When the tool (1) is run through the tubing, the flow detection tool (1) will detect the sound/and or ultrasound waves from the leak or flow (BL, AF), if present. In general, the closer the tool (1) is to the noise source, the stronger the detected noise signal is. However, as described above, the centralizers are a source of noise, and will, as long as the tool (1) is moving, reduce the signal to noise ratio and potentially the tool performance.

An effect of the invention is that the signal to noise ratio, in situations like the one in FIG. 1, is improved, not by reducing the background noise on the source side, but by shielding the detector side from unwanted road noise without affecting the signal path of the leak signals to be detected.

The tool (1) is typically lowered down the wellbore by a winch if the wellbore is substantially vertical. For horizontal wells a wellbore tractor may be used to increase the reach of the tool.

In FIG. 2b an additional through bore (10a) with an additional acoustic sensor assembly (20a) is shown. The use of multiple inserts or assemblies (20, 20a) can be used for redundancy, or where the acoustic sensor assemblies have different characteristics, such as sensitivity, bandwidth etc. to be able to improve the overall characteristics of the tool. Further, in an embodiment, one of the sensor assemblies (20) is primarily used for dynamic logging, while the other sensor assembly (20a) is primarily used for stationary logging, where each of the sensor assemblies (20, 20a) can be optimized for its specific use to be able to obtain the best possible sensitivity for combined dynamic and stationary logging, when needed without modifying the tool.

In an embodiment illustrated in FIG. 2b, multiple sensor assemblies (20, 20a, . . . ) may be arranged in arrays along the tool element (2) or along multiple interconnected tool elements (2) in the same way, to improve the overall characteristics and versatility of the tool.

The leakage detection tool can in an embodiment be run on memory. The tool is then battery operated and connected to surface via slickline. Data from the measurements can be stored in a memory within the tool string. The data will be extracted from the memory and processed further when the tool has been retrieved.

The invention claimed is:
1. A wellbore leakage detection tool comprising;
    a longitudinal tool element with centralizers, said longitudinal tool element comprising a through bore perpendicular to a longitudinal axis of said longitudinal tool element;
    an acoustic insulator arranged in said through bore; and
    an acoustic sensor assembly;

wherein said acoustic sensor assembly comprises an insert housing and an acoustic sensor arranged inside said insert housing, wherein said insert housing has first and second ends arranged on opposite sides of said acoustic sensor and facing laterally outwards of opposite ends of said through bore, wherein said acoustic sensor is an ultrasonic contact transducer, wherein said first and second ends are arranged to interface a wellbore fluid, and wherein said acoustic sensor is in direct acoustic contact with said insert housing, and wherein said sensor assembly is arranged suspended in said acoustic insulator inside said through bore, wherein said acoustic insulator has an acoustic impedance different from an acoustic impedance of said longitudinal tool element.

2. The wellbore leakage detection tool according to claim 1, wherein said acoustic sensor assembly is replaceable.

3. The wellbore leakage detection tool according to claim 2, comprising a lateral end stop arranged to secure said acoustic sensor assembly to said tool element in a lateral direction.

4. The wellbore leakage detection tool according to claim 1, wherein said acoustic insulator is one or more O-rings arranged about said acoustic sensor assembly.

5. The wellbore leakage detection tool according to claim 1, wherein said acoustic sensor assembly is arranged to sense sound and ultrasound waves up to 100 kHz.

6. The wellbore leakage detection tool according to claim 2, wherein said acoustic sensor assembly is arranged to sense sound and ultrasound waves up to 100 kHz.

7. The wellbore leakage detection tool according to claim 3, wherein said acoustic sensor assembly is arranged to sense sound and ultrasound waves up to 100 kHz.

8. The wellbore leakage detection tool according to claim 4, wherein said acoustic sensor assembly is arranged to sense sound and ultrasound waves up to 100 kHz.

9. A method for assembling a wellbore leakage detection tool, said method comprises the following steps:
assembling the leakage detection tool comprising a tool element with a longitudinal direction, the leakage detection tool being provided with centralizers;
assembling an acoustic ultrasonic sensor assembly by arranging an ultrasonic acoustic sensor inside, and in direct acoustic contact with an insert housing, wherein the insert housing has first and second ends arranged on opposite sides of said acoustic sensor;
arranging said ultrasonic acoustic sensor assembly with said first and second ends facing laterally outwardly of opposite ends of a through bore, perpendicular to the longitudinal direction of a tool element; and
suspending said insert housing with said ultrasonic acoustic sensor assembly in a damper arranged in said through bore, wherein said damper has an acoustic impedance different from an acoustic impedance of said tool element.

* * * * *